United States Patent [19]

Morse et al.

[11] Patent Number: 5,802,296

[45] Date of Patent: Sep. 1, 1998

[54] SUPERVISORY POWERS THAT PROVIDE ADDITIONAL CONTROL OVER IMAGES ON COMPUTERS SYSTEM DISPLAYS TO USERS INTERACTINGS VIA COMPUTER SYSTEMS

[75] Inventors: Norman Morse, Oakland; Jeffrey Douglas, San Jose, both of Calif.

[73] Assignee: Fujitsu Software Corporation, San Jose, Calif.

[21] Appl. No.: 691,695

[22] Filed: Aug. 2, 1996

[51] Int. Cl.$^6$ .................................. G06F 3/00; G06F 3/14
[52] U.S. Cl. ...................... 395/200.38; 395/200.33; 395/200.39; 345/7; 345/8
[58] Field of Search ................ 395/200.33, 200.38, 395/200.39; 345/7, 8

[56] References Cited

U.S. PATENT DOCUMENTS 5,544,320  8/1996  Konrad ......................... 395/200.33
5,684,943  11/1997  Abraham et al. ................ 345/8

OTHER PUBLICATIONS

Fukuda, K., et al., "Hypermedia Personal Computer Communication System: Fujitsu Habitat", *Fujitsu Sci. Tech. J.*, 26, 3, pp. 197–205 (Oct. 1990).

Morabito, M., "Enter the On–Line World of Lucasfilm", *Run*, pp. 24–28 (Aug. 1986).

Club Caribe Guidebook, Club Caribe Technology by Lucasfilm Ltd., 1989 Quantum Computer Services, Inc., 1989 Lucasfilm Ltd., 10 pp. (1989).

Fujitsu Habitat V2.1, Fujitsu Limited, 6 pp. (1989–1992).

U.S. Patent Application Serial No. 08/699,608, filed Aug. 2, 1996 by Randy Farmer et al., entitled "Virtual Objects for Building a Sense of Community in a Virtual World".

Pioch, N., "A Short IRC Primer", Nicolas.Pioch@grasp.insa–lyon.fr (Ed.1.1b, Feb. 28, 1993), 41 pages.

Rose, H., "What is IRC?", Hrose@kei.com, undated, 6 pages.

*Primary Examiner*—Krisna Lim
*Attorney, Agent, or Firm*—Skjerven, Morrill, MacPherson, Franklin & Friel LLP; Michael Shenker

[57] ABSTRACT

A computer system including computers interconnected by a network creates a virtual world in which computer users can interact with each other. Each user is represented graphically on computers' displays. Other objects (trees, buildings, and so on) are also represented. Each user can control its own representation in the virtual world to communicate with other users, to buy things, to move from place to place. A user may be given supervisory powers to have additional control over images on the displays. For example, a user having supervisory powers can summon other users, restrict other users' representations' ability to speak or move, create, delete or modify virtual objects in the virtual world. Convenient user interface is provided to exercise the supervisory powers.

18 Claims, 1 Drawing Sheet

SUPERVISORY POWERS THAT PROVIDE ADDITIONAL CONTROL OVER IMAGES ON COMPUTERS SYSTEM DISPLAYS TO USERS INTERACTINGS VIA COMPUTER SYSTEMS

The present application includes an Appendix A which includes source code of a computer program.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to computer systems that allow users to interact with each other, and more particularly, the invention relates to exercise of supervisory powers in such computer systems.

Computer systems allow users to interact with each other by sending electronic mail, by using bulletin boards, by playing computer games in which different players operate different computers interconnected by a network, and so on. Some computer systems allow a certain person, an "administrator", to exercise supervisory powers over other users. For example, in some systems the administrator can assign log-in IDs and passwords to control who may use the system.

It is desirable to find alternative systems and methods for providing supervisory powers.

SUMMARY

The present invention provides systems and methods to exercise supervisory powers in computer systems used for interaction among users. In some embodiments, a computer system comprises a plurality of input devices for receiving commands from a plurality of users and one or more displays for displaying representations of the users. In some embodiments, each user operates a separate computer in the computer system. The input devices include a keyboard, a mouse and/or other devices. Each user's own representation is shown on the display of the user's computer. We will call a user's representation an "avatar". In some embodiments, the user's display may also show representations of other users. More particularly, the users are represented as being in certain locales. Each user's display shows the locale in which the user's own avatar is. Each user's display shows also all the other avatars (if any) present in the same locale.

The avatars are virtual objects in the virtual world provided by the computer system. Locales may contain other virtual objects such as houses, trees and so on.

A user may acquire supervisory powers to control images on the displays. In some embodiments, the supervisory powers are defined by the data structures in the computer system. The supervisory powers may depend on an object that an avatar holds in its hands.

In some embodiments, the supervisory powers give a user power to summon another user. This means that the user possessing the supervisory powers can issue a command to the computer system to place an avatar of a different user to the same locale as the avatar of the user issuing the command. In some embodiments, a user may page another user having supervisory powers. In response to the page, the user having supervisory powers may have its avatar transferred to the paging user's locale, that is, to the locale containing the paging user's avatar.

In some embodiments, supervisory powers enhance a user's ability to move between locales. In some embodiments, supervisory powers give a user power to create, modify and delete objects.

Other features and advantages of the invention are described below. The invention is defined by the appended claims.

DESCRIPTION OF PREFERRED EMBODIMENTS

Figure 1:
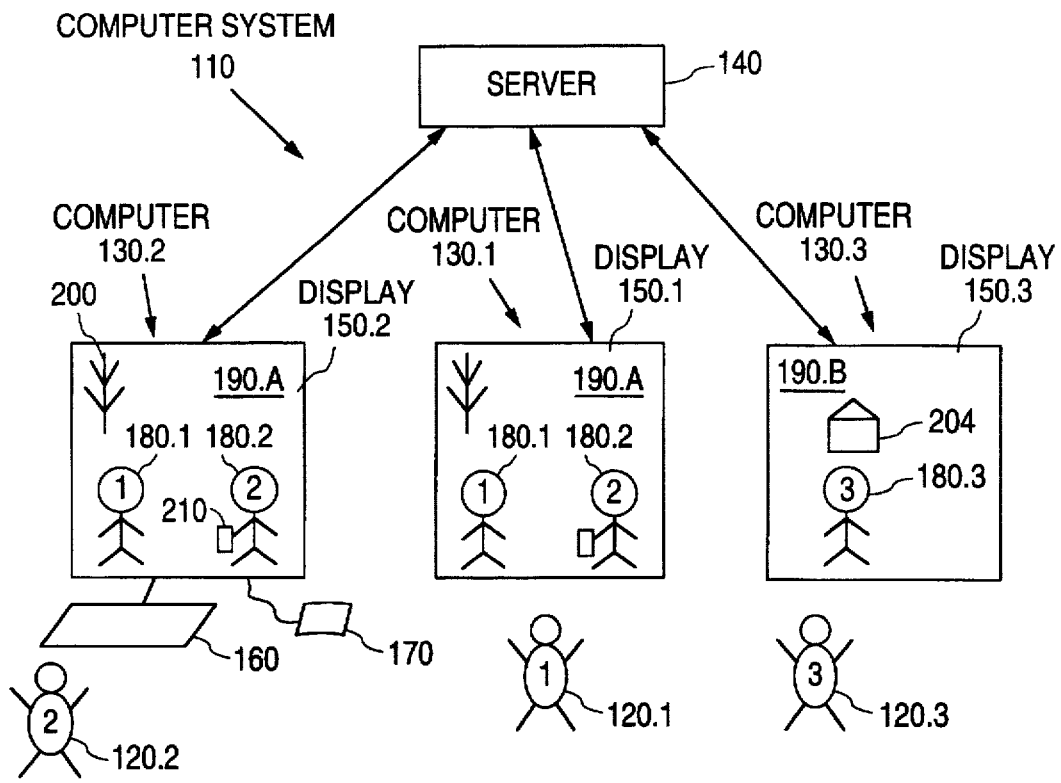
FIG. 1 is a block diagram of a computer system according to the present invention.

FIG. 1 shows a computer system 110 that allows users 120.1, 120.2, 120.3 to interact with each other. Each user 120.i operates a "client" computer 130.i. Clients 130 are connected to a server computer 140 via a network. The network need not have a star topology as shown in FIG. 1. In some embodiments, the network includes the public Internet.

Each client computer 130 includes a respective display 150 and one or more user input devices such as a keyboard 160 and a mouse 170. The input devices are shown only for client 130.2 for simplicity.

Each user 120.i is represented by a respective image 180.i in displays 150. We will call images 180 "avatars" herein. Display 150.2 shows avatars 180.1, 180.2 which represent respective users 120.1, 120.2. In some embodiments, each avatar 180 is a graphical representation of a human being. The images in FIG. 1 are simplified. In FIG. 1, the head of each avatar 180.i is a circle with the number i inserted for clarity. The image of each user 120.i in FIG. 1 also includes the respective number i.

In display 150.2, avatars 180.1, 180.2 are represented as being in a locale 190.A. Locale 190.A includes a tree 200 and, perhaps, other objects such as trees, hills, houses, streets, etc. (not shown). Each display 150.i of user 120.i displays a locale which includes the respective avatar 180.i. Since avatar 180.1 is in the same locale 190.A as avatar 180.2, display 150.1 shows the same locale 190.A, and the same avatars, as display 150.2. Avatar 180.3 is in a different locale 190.B shown in display 150.3. Locale 190.B includes a house 204 and perhaps other objects (not shown).

Avatars 180, tree 200, house 204, and other objects in displays 150 are virtual objects in a virtual world created by system 110. In this world, avatars 180 can interact with each other under the control of users 120. Thus, users 120 can in fact interact with each other by controlling their respective avatars 180. Some virtual objects may be not displayed on displays 150 at a given time. For example, some locale may not be displayed. If an avatar 180.i moves to that locale, the locale becomes displayed on the respective display 150.i.

Each user 120.i can control its avatar 180.i by issuing commands via the keyboard and/or mouse of client 130.i. Under the control of user 120.i, avatar 180.i can send messages to other users, speak, change its own appearance, move within a locale or to a different locale, buy things, and perform other actions, as described in U.S. patent application Ser. No. 08/699,698 "Virtual Objects for Building a Sense of Community in a Virtual World" filed by Randy Farmer, Chris Morningstar and John Onusco on Aug. 2, 1996. That application is hereby incorporated herein by reference.

In addition, an avatar may have supervisory powers to control objects in the virtual world, including control over other avatars. These powers include powers to do one or more of the following: 1) force another avatar to exit the virtual world (by forcing a log-out of the other avatar's user); 2) mute another avatar, that is, prevent the other avatar from speaking or issuing messages; 3) create, delete, or modify inanimate objects; and other powers. One of the powers is to turn another avatar into a "ghost". A ghost cannot pick up objects, operate machines, or do any things that require an avatar to use its hands. Ghosts are anonymous—their names are not shown to other users. Ghosts have a limited ability to move—they can move from a locale to a locale, but cannot move within a locale. Ghosts cannot think or talk in a public way, that is, in such a way that other users in the same locale can hear or understand a ghost. However, a ghost can send an ESP message, that is, a direct message to another user 120.i.

Server computer 140 includes a data structure for each object in the virtual world. The data structure for an avatar includes data bits that define the avatar's powers.

In some embodiments, system 110 provides the following 3 levels of supervisory powers:

1) avatar—the basic end-user—no supervisory powers.
2) oracle—a system administrator having great supervisory powers.
3) acolyte—a trusted end-user, or a "helper", having intermediate powers lower than those of an oracle but higher than those of a basic user.

In addition, some embodiments provide "wizard" powers that are higher than an oracle's powers. Wizard powers are typically given to system developers and are not used in end-user environments. Wizard powers will be ignored in the description of system 110.

In some embodiments, an oracle or an acolyte can exercise its supervisory powers only if the oracle or acolyte is holding in its hand a special object—an "amulet" or a "fiddle wand" (also called "fiddle"). The oracle's or acolyte's powers depend on the object in the oracle's or acolyte's hands. In FIG. 1, avatar 180.2 is holding an amulet 210 in its hand. The amulet is graphically represented as a book. Basic end-user avatars do not acquire any supervisory powers by holding an amulet or a fiddle.

When a user 120.i selects an object (for example, by clicking on the object with a mouse), client 130.i displays a menu of options on display 150.i. See the aforementioned patent application "Virtual Objects for Building a Sense of Community in a Virtual World". If user 120.2 selects amulet 210, the menu may include command options listed in the following Table 1:

TABLE 1

Join pager
Summon
Teleport
Join avatar
Permissions >
Choose a body >

---

The symbol ">" after "Permissions" indicates that if user 120.2 selects "Permissions", a submenu is displayed. Selecting "Body choices" also results in a submenu.

Figure 2:
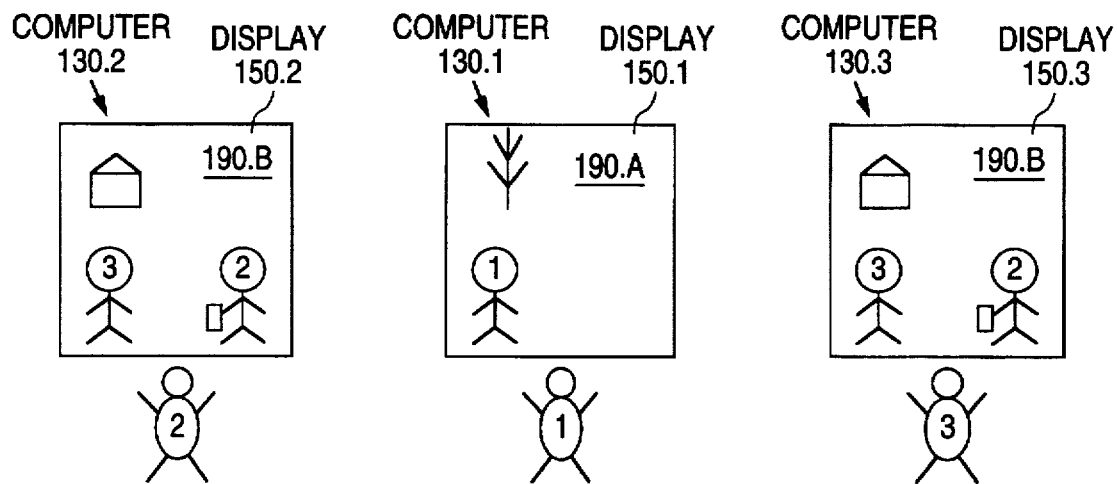
FIGS. 2 and 3 illustrate images in computer displays in the system of FIG. 1.

The option "Join pager" is displayed only if avatar 180.2 is an acolyte or an oracle. This option is meaningful if an oracle was paged by an another avatar, for example, by avatar 180.3. This means that avatar 180.3 issued a command to page an oracle or an acolyte. In response, client 130.3 sent an appropriate message to server 140 identifying avatar 180.3 as a pager. If user 120.2 selects "Join pager", avatar 180.2 is transferred to the locale 190.B, to join avatar 180.3, as shown in FIG. 2. More particularly, client 130.2 sends a message to server 140 that avatar 180.2 should join the last pager, i.e. the last avatar who paged an oracle or an acolyte. Server 140 determines that the last pager is avatar 180.3, and that the avatar 180.3 is in locale 190.B. Then server 140 sends appropriate information to clients 130 that are affected by the "Join pager" command. In response, clients 130.2, 130.3 display the locale 190.B with avatars 180.2, 180.3. Since avatar 180.1 remains in locale 190.A, client 130.1 displays this locale. Avatar 180.2 is gone from this locale.

Execution of a "Join pager" command is typical for system 110 in the following sense. When user 120.i issues a command, respective client 130.i typically sends a message to server 140. Server 140 updates the server's data structures as needed, and notifies clients 130 as needed. Clients 130 update their respective displays 150 as needed.

Each oracle or acolyte avatar 180.i may notify server 140 that this avatar is on or off duty. This is done by the avatar's user 120.i issuing an appropriate command to client 130.i (using the "Status" menu described in the aforementioned patent application "Virtual Objects for Building a Sense of Community in a Virtual World"). Server 140 maintains a list of all oracles and acolytes on duty. When another avatar pages an oracle or an acolyte, server 140 selects an oracle or acolyte from the list. Server 140 rotates oracles and acolytes on the on-duty list. This means that the first page goes to the first avatar on the list, the second page to the second avatar on the list, and so on to the end of the list, and then back to the beginning of the list. When server 140 selects an oracle or acolyte 180.i on the list, server 140 sends an appropriate message to the respective client 130.i.

Figure 3:
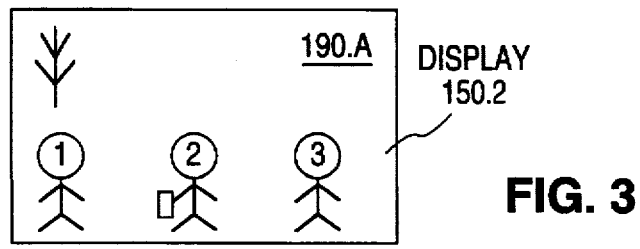

Now we return to describing the stage of FIG. 1 when user 120.2 selects amulet 210. If avatar 180.2 is an oracle, client 130.2 displays command options "Summon", "Teleport" and "Join avatar" (Table 1). If user 120.2 selects "Summon", client 130.2 displays a dialog test box "Summon who?". User 120.2 enters the name of another avatar. Suppose user 120.2 enters the name of avatar 180.3. (Any user 120.i can get the names of non-ghost avatars currently on line by issuing a command to client 130.i.) Client 130.2 sends an appropriate message to server 140. Server 140 updates its data structures, and it signals clients 130 that avatar 180.3 is now in locale 190.A. In response, client 130.2 displays locale 190.A as shown in FIG. 3. Avatar 180.3 is present in the locale. Clients 130.1, 130.3 display the same image, since their avatars 180.1, 180.3 are in the same locale.

If oracle user 120.2 selects "Teleport" (Table 1), client 130.2 displays a dialog text box in display 150.2, prompting user 120.2 to enter the name of the locale to go to. User 120.2 enters the locale's name. In response, avatar 180.2 is transferred to the desired locale. For example, if user 120.2 entered the name of locale 190.B, the displays 150 become as in FIG. 2.

Basic avatars (i.e., avatars with no supervisory powers) can teleport themselves to a different locale only through "teleport booth" objects—a basic avatar can teleport itself from a teleport booth in one locale to a teleport booth in a different locale. Basic avatars, oracles, and acolytes can move from a locale to an adjacent locale in the virtual world without teleporting. In addition, basic avatars can be teleported by an oracle as described below.

If oracle user 120.2 selects "Join avatar", client 130.2 displays a dialog text box prompting user 120.2 to enter the name of the avatar to join. User 120.2 enters the avatar's name. In response, system 110 transfers avatar 180.2 to the locale of the avatar whose name was entered by user 120.2. The transfer of avatar 180.2 is accomplished similarly to the "Join pager" command. For example, if the user entered the name of avatar 180.3, the displays 150 become as in FIG. 2.

The option "Permissions" (Table 1) is displayed only if avatar 180.2 is an oracle and has a permission to change supervisory powers. This permission is indicated by a flag AVATAR_PERM_PROMOTE in the avatar 180.2 data structures in system 110. If user 120.2 selects "Permission", client 130.2 displays the following submenu (Table 1.1) to the right of the menu of Table 1:

TABLE 1.1

Avatar
Acolyte
Oracle

---

If user 120.2 selects one of these three options, a message is sent to server 140 to set the supervisory powers of avatar 180.2 respectively to "Avatar" (that is, no supervisory powers), "Acolyte", or "Oracle". Thus, avatar 180.2 can change its own powers.

We return now to the menu displayed when user 120.2 selects amulet 210. If avatar 180.2 is an oracle, the menu displayed includes "Choose a body" (Table 1). If user 120.2 selects "Choose a body", client 130.2 displays the following submenu (Table 1.2):

TABLE 1.2

Male >
Female >
Oracle

---

If user 120.2 selects "Male", the following submenu (Table 1.2.A) is displayed by client 130.2:

TABLE 1.2.A

Stocky build
Muscular build
Medium build

---

If user 120.2 selects "Female" (Table 1.2), the submenu of Table 1.2.B appears:

TABLE 1.2.B

Stocky build
Medium build
Athletic build

---

If user 120.2 selects an option of Table 1.2.A or 1.2.B, the image of avatar 180.2 is set to correspond to the selected option. For example, if user 120.2 selects "Muscular build" in Table 1.2.A, avatar 180.2 is drawn to look like a muscular male.

If the user selects "Oracle" in Table 1.2, avatar 180.2 is made to look like a robed figure representing an oracle.

The body choices other than "Oracle" are available to all avatars including non-oracle avatars. However, non-oracle avatars can change their body images only by paying "tokens" to a body changer machine. Tokens represent money in the virtual world of system 110. See the above-mentioned patent application "Virtual Objects for Building a Sense of Community in a Virtual World". Tokens and a body changer machine are virtual objects in the virtual world.

Suppose now that the system 110 is at the stage of FIG. 1, but amulet 210 is not in any avatar's hand. For example, suppose that amulet 210 is lying on the ground in locale 190.A. If user 120.2 selects amulet 210, and the respective avatar 180.2 does not hold anything in its hands, the menu displayed by client 130.i includes the options in the following Table 2:

TABLE 2

Walk to
Get

---

These options are displayed whether or not the "actor" avatar 180.2 has any supervisory powers. (Each avatar 180.i is called an "actor" with respect to the corresponding client 130.i and the respective user 120.i.)

If user 120.2 selects "Walk to", and avatar 180.2 is not adjacent to amulet 210, avatar 180.2 walks up to amulet 210. The Walk animation is performed in response to a message from server 140 after server 140 receives a signal indicating the "Walk to" command. The Walk animation is performed by all the clients 130 displaying the locale 190.A, that is, by clients 130.2, 130.1.

If user 120.2 selects "Get" (Table 2), system 110 performs as follows. If avatar 180.2 is not adjacent to amulet 210, avatar 180.2 walks to amulet 210, as in the "Walk to" command. Then avatar 180.2 gets amulet 210 and holds the amulet in its hand. These actions are displayed on displays 150.1, 150.2.

Suppose now that amulet 210 is in the hand of avatar 180.2 as shown in FIG. 1. Suppose that user 120.2 selects an object other than the amulet. We will call the selected object a "target". In response to the selection, if the actor avatar 180.2 is an oracle or an acolyte, client 130.2 displays a menu that may include one or more of the following options:

TABLE 3

Teleport
Force to ghost
Freeze
Unfreeze
Mute
Unmute
Force Log Out
Disclose Owner
Permissions >
Choose a body >

---

The option "Teleport" is displayed if actor avatar 180.2 is an oracle. This option allows user 120.2 to move the target object to a different locale. The target can be another avatar such as avatar 180.1, or an inanimate object such as tree 200. Execution of this command is similar to the execution of the Teleport command of Table 1. More particularly, client 130.2 displays a dialog text box prompting user 120.2 for the destination locale. User 120.2 enters the destination. Client 130.2 sends a message to server 140 that the target object should be moved to the destination locale. Server 140 updates its data structures and sends the appropriate messages to clients 130 as needed. Clients 130 update their displays as needed.

The remaining options of Table 3 can appear if the actor avatar 180.2 is an oracle or an acolyte, and the target object is an avatar (i.e., avatar 180.1 or 180.2). Option "Force to ghost" is displayed if the target object is not the actor avatar 180.2. If user 120.2 selects this option, system 110 turns the target avatar (for example, avatar 180.1) into a ghost.

Option "Unfreeze" is displayed if the target avatar (180.1 or 180.2) has its flag AVATAR_PERM_FREEZE set in the data structures in system 110. This flag is set if the avatar is frozen, that is, forbidden to gesture or move in any way. If this flag is reset, option "Freeze" is displayed instead of "Unfreeze". If user 120.2 selects "Unfreeze", the target avatar 180 becomes unfrozen. Unfreezing is accomplished by client 130.2 sending an appropriate message to server 140, and server 140 notifying clients 130 as needed.

If user 120.2 selects "Freeze", client 130.2 prompts the user to enter for how many minutes the target avatar is to be frozen. User 120.2 enters the number of minutes. Client 130.2 sends a message to server 140 to update the target avatar data structures. Server 140 notifies all the clients 130 displaying the target avatar 180 that the avatar is frozen. Client 130.2 displays a message confirming that the target is now frozen.

Options "Mute" and "Unmute" are similar respectively to "Freeze" and "Unfreeze", but "Mute" and "Unmute" affect the target avatar's ability to speak, think, or send messages rather than to move. "Mute" is displayed if the target avatar's flag AVATAR_PERM_MUTE is reset. Otherwise, "Unmute" is displayed instead. If user 120.2 selects "Mute", the user is prompted for the number of minutes for which the target avatar is to be muted. If muting is successful, it is confirmed on display 150.2 of client 130.2.

The remaining options "Force Log Out" through "Choose a body" in Table 3 can be displayed if actor avatar 180.2 is an oracle. In particular, "Force Log Out" and "Disclose Owner" are displayed in this case. If user 120.2 selects "Force Log Out", and the target avatar 180.i is not the actor 180.2, the target avatar's user 120.i is forced to log out from the virtual world. This operation is performed by server 140 when server 140 receives an appropriate request from client 130.2. Server 140 sends a message to the target avatar's client 130.i to accomplish the log out.

If user 120.2 selects "Disclose Owner" (Table 3), server 140 sends to client 130.2 information on the account of the target avatar's user 120.i. This information includes the real name of user 120.i, and not just the virtual world name available to other users 120. In the description of system 110, the term "name" without "real" means the virtual world name unless stated otherwise. The information includes also information on the target avatar's client system 130.i. This information is displayed by client 130.2.

If the actor avatar 180.2 is an oracle, and its flag AVATAR_PERM_PROMOTE is set, client 130.2 displays "Permissions". If user 120.2 selects "Permissions", the operation of system 110 is similar to the operation for the "Permissions" command of Table 1, but user 120.2 sets supervisory powers for target avatar 180.i which is not necessarily the actor 180.2. For example, user 120.2 can promote avatar 180.1 to the acolyte or oracle status, or demote avatar 180.1.

The "Choose a body" command option of Table 3 is displayed if actor 180.2 is an oracle. This command is similar to the respective command of Table 1, but it is applied to the target avatar which is not necessarily the actor 180.2. For example, user 120.2 can change the image of avatar 180.1.

The supervisory powers provided by the fiddle will now be described. In some embodiments, these powers do not depend on whether the actor avatar is an oracle or an acolyte. Instead, these powers depend on the setting of the actor's flag AVATAR_PERM_FIDDLE in server 140. This flag is set outside the virtual world when a script is run on server 140 to modify the server's database.

Suppose that the system is in the state of FIG. 1, but object 210 is a fiddle rather than an amulet. (In some embodiments, the fiddle is represented by a scepter with a jeweled head. Other graphical representations are used in other embodiments.) If actor avatar 180.2 does not hold a fiddle in its hand, for example, the fiddle is lying on the ground, and if user 120.2 selects the fiddle, the menu displayed includes the options of Table 2 above. These options are displayed even if actor 180.2 is a basic avatar. The operation of system 110 in response to user 120.2 selecting these commands is similar to the amulet case described above in connection with Table 2. If user 120.2 selects "Walk to", actor 180.2 walks to the fiddle if actor 180.2 is not adjacent to the fiddle. If the user selects "Get", actor 180.2 takes the fiddle in the actor's hand.

If actor avatar 180.2 is holding the fiddle 210 in its hand (as shown in FIG. 1), but user 120.2 selects an object other than the fiddle, then the client 130.2 checks the flag AVATAR_PERM_FIDDLE of actor avatar 180.2. If this flag is set, the menu displayed includes the fields shown in the following Table 4:

TABLE 4

| Create Object |
| Delete Object |
| Modify Object |
| --- |
| --- |

If user 120.2 selects "Create Object", client 132.2 displays a list of possible classes of objects and allows the user to select from the list. The list is given in the following Table 5:

TABLE 5

| Accessory |
| Amulet |
| Atm |
| Body changer |
| Compass |
| Container |
| Document |
| Door |
| Fiddle |
| Flat |
| Head |
| Key |
| Magic |
| Nicknack |
| Pawnmachine |
| Registry |
| Tokens |
| Seating |
| Sign |
| Spraycan |
| Teleport |
| Vendroid |
| Activated nicknack |
| Robot |
| Elevator |
| --- |
| --- |

User 120.2 selects the desired object class. Client 130.2 creates data structures for a new object of the class as needed, and sends a message to server 140 to create appropriate data structures on the server. Server 140 notifies clients 130 as needed to display the new object in locale 190.A.

In Table 5, "Accessory" objects and objects worn on an avatar's head, such as a hat, a wig, a face mask, or spectacles. "Atm" stands for automatic teller machine. This object is described in the aforementioned application "Virtual Objects for Building a Sense of Community in a Virtual World". "Body changer" stands for a body changing machine. This machine allows avatars to change their body images. See the aforementioned application "Virtual Objects for Building a Sense of Community in a Virtual World".

"Flat" objects are background scenery objects such as the sky, a floor, or a ceiling.

"Head" is a head for an avatar. Avatars 180 have removable, replaceable heads.

"Magic" objects give to avatars, including basic avatars, limited ability to affect other avatars for a limited period of time. For example, using a magic object, an avatar can turn another avatar into a frog for a limited time, freeze another avatar, or turn what the other avatar says into gibberish. In some embodiments, a magic object can be used only for a limited number of times.

"Nicknack" objects are small objects such as potted plants.

"Pawnmachine" is an object that gives an avatar tokens in return for objects.

"Registry" allows an avatar to change the avatar's own name available to other users.

"Seating" includes chairs, benches, and other objects to sit on.

"Sign" is a street sign or any other sign for display.

"Spraycan" is a spray can that an avatar can use to change a color of another object or a part of the avatar's own body.

"Teleport" is a teleport booth that allows a basic avatar to go to a different locale.

"Vendroid" is a vending machine.

"Activated nicknack" is a small object associated with some animation and/or sound. The object moves and/or emits sounds unless the animation and/or sound are turned off.

"Robot" is an object that can perform a limited number of tasks. For example, an apartment manager can be a robot that presents lease terms to avatars and does limited transactions.

"Elevator" is similar to a teleport booth, but an elevator can take an avatar only to a list of registered places to which the elevator can go. For example, in a building, an elevator can take an avatar to an apartment.

If user 120.2 selects "Delete Object" (Table 4), client 130.2 prompts the user for a confirmation. If the user confirms the request to delete the target object, a message is sent to server 140 to update the server's data structures. Server 140 notifies clients 130 that the object is deleted and is not to be displayed in locale 190.A.

If user 120.2 selects "Modify Object" (Table 3), client 130.2 displays a dialog box inviting user 120.2 to select the target object's parameter that the user wants to modify. For example, if the target object is a token, user 120.2 can change the token value. If the target object is a tree, user 120.2 can change the tree's height or color. If the target object is an avatar, user 120.2 can change the target avatar's data structures in system 110. If the target object is a vending machine, user 120.2 can set what objects are offered for sale by the vending machine.

Appendix A contains the source code for programs for one embodiment of the present invention. The program executed on server 140 is written in programming language C. The program to be executed on each client 130 is written in TCL (Tool Command Language). TCL is described, for example, in B. Welch, "Practical Programming in Tcl and Tk" (1995). The particular Tcl extension used in Appendix A (TCL) allows an application programmer to modify itself) is described in Appendix 1. In some embodiments, server 140 and clients 130 are IBM PCs executing the Windows 95 (Trademark) operating system.

The embodiments described above illustrate but do not limit the invention. In particular, the invention is not limited by the type of a network interconnecting clients 130 and server 140, or by the type of hardware or operating system used on the clients and the server. The invention is not limited by any particular graphical representations, menu options, data structures, or interaction between clients 130 and server 140. The invention is not limited to the keyboard and mouse as input devices. Light pens, touch screens, or other input devices are used in some embodiments. Other embodiments and variations are within the scope of the invention, as defined by the following claims.

APPENDIX 1

Description

Tool Command Language (TCL) is public domain software designed for use in embedded applications. TCL provides a full featured interpretive language which executes very quickly (for an interpreter). The interpreter primitives may be customized depending upon the application, either TCL or C may be used to create additional commands which the interpreter then understands. TCL command definitions consist of ASCII strings, and may be modified, deleted, or added while the interpreter is running.

The primary reasons to use a TCL based client are:

The TCL engine provides for interactive debugging of client functions during development.

TCL commands may be added, modified, or deleted while the system is running.

TCL commands may be defined independent of client architecture, allowing all clients to share the same TCL code resources.

Requirements

Any internal execution engine must meet these requirements:

Any method of any object must be callable given its object id and method number.

A method should be able to "block", allowing other methods to execute until it is "unblocked".

A method should be "updatable" to provide for remote object updating.

New methods should be "addable" to provide for new objects.

C Interface

The Interverse TCL engine is a stock TCL 7.3 distribution which has been modified for transportability between operating systems. A TCL debugger extension has also been added. Most file I/O and OS specific commands have been deleted. Other commands will be added as required.

The TCL engine is contained within a library which exports these functions:

int iv_tcl_init (void)

Initialize the TCL engine.

int iv_tcl_term (void)

Terminate the TCL engine, free up memory etc.

int iv_tcl_eval(char *script, int show_results)

Evaluate the specified NULL terminated script. If script is NULL, no script is executed, but any outstanding scripts which may be unblocked may continue execution. The show_results parameter, if set, displays all output using the standard output function specified in iv_tcl_io( ). If show_results is false, all results are eaten and not displayed.

int iv_tcl_io(int (*infun) (char *,int),int (*outfun) (char *))

This routine uses function pointers as parameters. The infun parameter specifies an input function which is used to get commands for TCL evaluation. infun is called with a buffer pointer and a buffer size. The outfun function is used to handle output from the TCL interpreter. outfun is called with a null terminated string as a parameter. Both functions should return a zero if there is no error.

int iv_tcl_os_events(void (*) (void *), void *)

This function is called with a function pointer as a parameter. The parameter specifies a function to call which handles all the OS dependent events. Essentially this function is to be a single pass through the OS event loop. When TCL is waiting for an event to occur, it calls this function while intermittently polling for the event.

int iv__tcl__timer(unsigned long (*timerfun) (void))

This function is called with a function pointer as a parameter. The parameter specifies a function to call which returns an unsigned long containing a tick count in microseconds.

TCL COMMANDS

Deletions

The following functions have been removed from the standard TCL distribution to create a Multi-OS transportable TCL engine:

history, cd, close, eof, exec, file, flush, glob, open, pid, pwd, read, seek, source, tell, time.

Additions

The following TCL functions have been added to the interverse TCL engine:

TABLE 1

Interverse Extensions

| Command | Description of Interverse TCL extension |
|---|---|
| @ | Field Reference Operator |
| bind-object | Binds struct names to existing object structs |
| bind-class | Binds struct names to existing class structs |
| bind-message | Binds struct names to existing message structs |
| forget | eliminate a binding of a name to any struct |
| request | send request message to the host |
| command | send a command message to a local object noid |

Field reference

The field reference command is @. There are three basic forms:

@<struct-name><field-name> where <struct-name> and <field-name> are strings. Returns the value of the field named <field-name> in the structure identified by <struct-name>.

@<struct-name><field-name><value> where <value> is an expression. Evaluates <value> and assigns the result as the new value of the field named <field-name> of the structure identified by <struct-name>. Returns the value assigned.

@<struct-name>{<field-name><value> ... } similar to the previous form, except that any number of <field-name><value> pairs may be given, assigning any number of fields. Returns the value of the last field assigned.

Object structs

The 'bind-object' command binds struct names to existing object structs. It takes the form:

bind-object <noid><struct-name> where <noid> is a number and <struct-name> is a string. Binds <struct-name> to the struct containing the state of the object whose noid is <noid>. The class of the object will be determined by looking at the object itself.

Class structs

The 'bind-class' command binds struct names to existing class structs. It takes the form:

bind-class <class-number><struct-name> where <class-number> is a number and <struct-name> is a string. Binds <struct-name> to the class struct for class <class-number>.

Message structs

The 'bind-message' command binds struct names to existing message structs. It takes the form:

bind-message <message><struct-name> where <message> and <struct-name> are strings. Binds <struct-name> to the message struct for message <message>. <message> is a keyword which indicates which message from the environment we are talking about. Right now, the only valid value is "command".

Other operations

The 'forget' command eliminates the binding of a name to any struct. It takes the form:

forget <struct-name> where <struct-name> is a string. Any struct binding to <struct-name> is removed. If the struct itself had been dynamically created as the result of some other operation, it is deallocated.

The 'request' command is used for sending request messages to the host. It takes the form:

request <to><req>{<field-name><value> ... }<reply><reply-name>

Creates a message struct for request message <req>, assigns the fields of it according to the sequence of <field-name><value> pairs, sends it to object noid <to> on the host, waits for the reply, puts the reply in a newly created message struct of type <reply> and binds <replyname> to this struct. If you omit the <reply-name>:

request <to><req>{<field-name><value> ... }<reply> it defaults to 'reply'. Alternatively, leaving off the <reply> message type entirely:

request <to><req>{<field-name><value> ... } sends the request message but does not expect (or wait for) a reply.

Similarly, the 'command' command:

command <to><cmd>{<field-name><value> ... } sends the command message <cmd> to object noid <to> locally (with no reply expected or possible).

The TCL Debugger

A TCL debugger has been added to the TCL engine also. To turn the debugger on use debug 1, to turn it off use debug 0. Within the debugger the following commands are available.

TABLE 2

TCL Engine Debug Commands

| Command | Description of Debug Command |
|---|---|
| n | step over procedure |
| s | step into procedure |
| c | continue |
| r | return from procedure |
| w | show stack |

TABLE 2-continued

TCL Engine Debug Commands

| Command | Description of Debug Command |
|---|---|
| b | set, clear, or show breakpoint |
| u | move scope up |
| d | move scope down |
| h | help |

More information on these debugger commands can be found in external documentation.

Dependencies

The Interverse TCL engine depends on the Smartheap libraries.

We claim:

1. A computer system comprising:

a plurality of input devices for receiving commands from a plurality of users;

one or more displays for displaying representations of said users; and means for controlling displays in response to said commands to allow said users to interact with each other, wherein said means is to allow each user to control said user's representation on said displays, said means allowing at least one user U1 to receive one or more supervisory powers that provide to said user U1 additional control over images on said displays.

2. The computer system of claim 1 wherein said supervisory powers give said user U1 power to summon another user U2 such that in response to a command from said user U1 the representation of said user U2 is placed in the same locale as the representation of said user U1.

3. The computer system of claim 1 wherein said commands include a command to page a user with supervisory powers, and wherein said supervisory powers give said user U1 power to have said user U1's representation join the representation of a user who issued said page command.

4. The computer system of claim 3 wherein to exercise said power to have said user U1's representation join the representation of a user U2 who issued said page command, said user U1 need not identify said user U2 in any way other than as the last user to issue said page command, and wherein said means is to determine itself who is the last user to have issued said page command.

5. The computer system of claim 1 wherein said supervisory powers give said user U1 power to have said user U1's representation join the representation of another user upon said user U1 identifying said other user to said computer system.

6. The computer system of claim 1 wherein said supervisory powers give said user U1 power to change said user U1's supervisory powers.

7. The computer system of claim 1 wherein said supervisory powers give said user U1 power to change an appearance of said user U1's representation without said user U1 using tokens which are virtual objects created by said computer system and representing money in a virtual world created by said computer system.

8. The computer system of claim 1 wherein said supervisory powers include power to force a representation of another user into a ghost state in which said representation has a limited ability to move or communicate with other representations in a virtual world containing said representations.

9. The computer system of claim 1 wherein said supervisory powers include power to freeze a representation of another user to prevent that representation from moving in a virtual world containing said representations.

10. The computer system of claim 1 wherein said supervisory powers include power to mute a representation of another user to prevent that representation from issuing messages in a virtual world containing said representations.

11. The computer system of claim 1 wherein said supervisory powers include power to force another user to log out from a virtual world containing said representations.

12. The computer system of claim 1 wherein said supervisory powers give said user U1 power to change another user's supervisory powers.

13. The computer system of claim 1 wherein said supervisory powers include a power to create an object in a virtual world containing said users' representations.

14. The system of claim 1 wherein said supervisory powers include a power to delete an object in a virtual world containing said users' representations.

15. The computer system of claim 1 wherein said supervisory powers include a power to modify an object in a virtual world containing said users' representations.

16. The computer system of claim 1 wherein said user U1 can exercise supervisory powers only when said representation of said user U1 is holding a predetermined object.

17. A method for a plurality of users to interact with each other via a computer system capable to display a representation of each user and to allow each user to control said user's representation by issuing commands to said computer system, said method comprising:

associating by said computer system one or more supervisory powers with a representation of a user U1, each supervisory power providing to said user U1 additional control over images on one or more displays of said computer system;

issuing a command by said user U1 to said computer system to exercise a supervisory power; and executing said command by said computer system.

18. The method of claim 17 wherein said command is to summon another user U2; and executing said command comprises placing the representation of said user U2 in the same locale as said representation of said user U1 a virtual world containing said representations.

* * * * *